US 12,409,726 B2

(12) United States Patent
Oka et al.

(10) Patent No.: US 12,409,726 B2
(45) Date of Patent: Sep. 9, 2025

(54) VEHICLE DIFFERENTIAL AND VEHICLE (71) Applicant: Mazda Motor Corporation, Hiroshima (JP)

(72) Inventors: Nobuyuki Oka, Hiroshima (JP); Yuzo Ohkawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 18/906,192

(22) Filed: Oct. 4, 2024

(65) Prior Publication Data
US 2025/0121680 A1 Apr. 17, 2025

(30) Foreign Application Priority Data

Oct. 13, 2023 (JP) .................................. 2023-177746

(51) Int. Cl.
*F16H 48/22* (2006.01)
*B60K 17/16* (2006.01)
*B60K 17/348* (2006.01)
*B60K 23/04* (2006.01)

(52) U.S. Cl.
CPC ............ *B60K 17/20* (2013.01); *B60K 17/348* (2013.01); *B60K 23/04* (2013.01); *F16H 48/22* (2013.01)

(58) Field of Classification Search
CPC ........... F16H 48/22; F16H 48/20; F16H 48/08
USPC ................... 475/231, 234, 235, 236
See application file for complete search history.

(56) References Cited

U.S. PATENT DOCUMENTS

| 1,361,895 | A | * | 12/1920 | Nogrady | ................. | F16H 48/22 475/234 |
| 1,750,981 | A | * | 3/1930 | Wildhaber | ............... | F16H 48/22 475/241 |
| 2,431,272 | A | * | 11/1947 | Mynssen | ................ | F16H 48/08 475/241 |
| 2,545,601 | A | * | 3/1951 | Brubaker | ................ | F16H 48/08 475/231 |
| 2,923,174 | A | * | 2/1960 | Gleasman | ............... | F16H 48/22 74/650 |
| 3,457,807 | A | * | 7/1969 | Altmann | .................. | F16H 48/08 475/240 |

(Continued)

FOREIGN PATENT DOCUMENTS

FR 2944082 A1 * 10/2010 ............. F16H 48/22
JP H09-49560 A 2/1997

(Continued)

OTHER PUBLICATIONS

Extended European Search Report issued Feb. 13, 2025 in European Patent Application No. 24201250.8.

*Primary Examiner* — Sherry L Estremsky
(74) *Attorney, Agent, or Firm* — XSENSUS LLP (57) ABSTRACT

A vehicle differential includes: a pair of side gears arranged in a differential case; a plurality of friction plates arranged on an axially outer side of respective one of the side gears; and a pressing member that holds the plurality of friction plates together with respective one of the side gears. Each of the side gears has: a gear section that meshes with a pinion gear; and a cylindrical section s that extends from a radially inner portion of the gear section toward an axially side. outer An outer circumferential portion of the cylindrical section meshes with an inner circumferential portion of the pressing member via a helical spline.

20 Claims, 6 Drawing Sheets

(56) References Cited

U.S. PATENT DOCUMENTS

| | | | | |
|---|---|---|---|---|
| 3,523,467 A | * | 8/1970 | Shachter | ............... F16H 48/08 |
| | | | | 475/240 |
| 3,815,443 A | * | 6/1974 | McAninch | ............. F16H 48/22 |
| | | | | 475/235 |
| 6,283,889 B1 | | 9/2001 | Bordner | |
| 2017/0299036 A1 | | 10/2017 | Zhao et al. | |

FOREIGN PATENT DOCUMENTS

| | | | |
|---|---|---|---|
| JP | 2003-130181 A | | 5/2003 |
| WO | WO-2011105917 A1 * | 9/2011 | ......... B60K 17/3465 |

* cited by examiner

VEHICLE DIFFERENTIAL AND VEHICLE

CROSS-REFERENCE TO RELATED APPLICATION

The present application claims priority to Japanese Patent Application 2023-177746, filed Oct. 13, 2023, the entire contents of which are incorporated herein by reference.

FIELD

A technique disclosed herein relates to a vehicle differential and a vehicle.

DESCRIPTION OF THE RELATED ART

Conventionally, a differential having a differential limiting mechanism has been considered.

For example, the following differential is disclosed in Patent Literature 1. The differential includes: differential case that is rotationally driven by drive power of an engine; a differential gear mechanism that distributes rotation of the differential case to wheel sides via a pair of side gears; a cone clutch that is formed between the differential case and a clutch member, is engaged by receiving a meshing reaction force of the side gear, and thereby limits differential movement of the differential gear mechanism; and a cam mechanism that is provided between the clutch member and each of the side gears, actuates by receiving the drive power, and thereby presses the cone clutch.

The differential in Patent Literature 1 employs a helical spline as the cam mechanism.

CITATION LIST

Patent Literature

[Patent Literature 1] JPH09-49560A

SUMMARY

From a perspective of improving travel performance, it has been considered to differentiate a differential limiting force, which limits differential movement of right and left drive wheels, during acceleration from that during deceleration. The following is disclosed in Patent Literature 1. During acceleration of a vehicle, the cone clutch is pressed against the differential case by the meshing reaction force from the pinion gear to the side gear and an outward meshing thrust reaction force from the helical spline. Meanwhile, during deceleration (braking) of the vehicle, a force to press the cone clutch against the differential case is reduced by an inward meshing thrust reaction force from the helical spline.

However, when examining the differential described in Patent Literature 1, it may be seen that counteraction of the helical spline was not taken into consideration in the differential described in Patent Literature 1. That is, in the differential described in Patent Literature 1, in addition to the above-described force, an inward reaction force is added to the side gear due to the counteraction of the helical spline during the acceleration of the vehicle. Since the inward reaction force added to the side gear is equal to the above-described meshing thrust reaction force, the force to press the cone clutch only includes the meshing reaction force from the pinion gear to the side gear. Meanwhile, during the deceleration of the vehicle, in addition to the above-described force, an outward reaction force is added to the side gear due to the counteraction of the helical spline, the force to press the cone clutch only includes the meshing reaction force from the pinion gear to the side gear. Thus, in the differential described in Patent Literature 1, the differential limiting force hardly varies during the acceleration and the deceleration.

It is also considered to employ electronic control in order to adjust the differential limiting force. However, complication of the configuration of the differential and a cost increase thereof are inevitable.

A technique disclosed herein has been made in view of such points and therefore provides a differential capable of adjusting a differential limiting force with a simple configuration.

In order to address the issues described above, a first aspect of a technique disclosed herein is directed to a vehicle differential that is mounted on a vehicle and configured to include: a differential case that receives drive power of a drive source and rotates; a pair of side gears arranged in the differential case in a coaxial manner with a rotation axis of the differential case; a pinion gear that meshes with both of the paired side gears; and a differential limiting mechanism provided to at least one side in a rotation axis direction, in which the differential limiting mechanism has: a plurality of friction plates arranged on an opposite side to the pinion gear, with respect to each of the side gears, in the rotation axis direction; and a pressing member arranged on an opposite side to each of the side gears, with interposing the plurality of friction plates, in the rotation axis direction to hold the plurality of friction plates together with respective one of the side gears, in which each of the side gears located on the one side in the rotation axis direction has: a gear section that meshes with the pinion gear; and a cylindrical section that extends from a radially inner portion of the gear section with respect to the rotation axis toward an opposite side to the pinion gear and a cylindrical axis of which is coaxial with the rotation axis, and in which an outer circumferential portion of the cylindrical section meshes with an inner circumferential portion of the pressing member via a helical spline.

With this configuration, when the helical spline is subjected to a force in a direction in which the pressing member separates from the friction plates, the force in the direction away from the friction plates is input to each of the side gears due to counteraction from the helical spline. This reduces a force to hold the plurality of friction plates and further reduces a friction force applied between the plurality of friction plates. As a result, a differential limiting force is reduced. Meanwhile, when the helical spline is subjected to a force in a direction in which the pressing member approaches the friction plates, the force in the direction approaching the friction plates is also input to each of the side gears due to the counteraction from the helical spline. This increases the force to hold the plurality of friction plates and further increases the friction force applied between the plurality of friction plates. As a result, the differential limiting force is increased. The direction of the force applied to the helical spline is opposite during acceleration and deceleration. Thus, a magnitude of the differential limiting force can be changed during the acceleration and the deceleration. In addition, the magnitude of the differential limiting force can be adjusted by adjusting an angle of the spline tooth of the helical spline. Thus, the magnitude of the differential limiting force can be adjusted easily. Therefore, the differential limiting force can be adjusted with the simple configuration.

In the first aspect, a second aspect of the technique disclosed herein is configured that some of the plurality of friction plates are spline-fitted to the pressing member and that the rest of the plurality of friction plates are fixed to the differential case.

With this configuration, in the cylindrical section of each of the side gears, an area available for the helical spline can be enlarged as much as possible. As a result, even when the cylindrical section is reduced in length in the rotation axis direction, a sufficiently large force can be input to each of the side gears via the helical spline. Therefore, the differential can have a compact configuration.

In the first aspect, a third aspect of the technique disclosed herein is configured that some of the plurality of friction plates are spline-fitted to the cylindrical section and that the rest of the plurality of friction plates are fixed to the differential case.

With this configuration, some of the friction plates are integrated with the side gears. Thus, a relatively large thrust load can be input. This can increase a range of the adjustable differential limiting force as wide as possible.

In the first aspect, a fourth aspect of the technique disclosed herein n is configured that the differential limiting mechanism further has a disc spring that inputs a force directed toward the pressing member side in the rotation axis direction to the plurality of friction plates and that the gear section has a spring housing section that is provided in a portion on the friction plate side in the rotation axis direction and is recessed to an opposite side to the friction plates in the rotation axis direction to house the disc spring.

With this configuration, the disc spring can apply initial torque to the friction plates. By arranging the disc spring in the spring housing section, it is possible to suppress enlargement of the differential in the rotation axis direction, which is caused by the disc spring. In other words, the differential can have a compact configuration while a mechanism to apply the initial torque is employed. In addition, by housing the disc spring in the spring housing section, the initial torque can be input to the friction plates in an independent manner of a meshing reaction force between the pinion gear and the side gear and a force via the helical spline. As a result, a magnitude of the initial torque can be set appropriately.

A fifth aspect of the technique disclosed herein is configured that the differential limiting mechanism is arranged on each side in the rotation axis direction.

With this configuration, since differential movement of each of the side gears can be limited, differential limiting capability can be exerted appropriately.

In any one of the first to fifth aspects, a sixth aspect of the technique disclosed herein is configured that the vehicle is a rear-wheel-drive or all-wheel-drive vehicle and that the sixth aspect of the technique disclosed herein is used for differential control of a rear wheel of the vehicle.

In particular, in the sixth aspect, a seventh aspect of the technique disclosed herein is configured that the helical spline is formed with a spline tooth such that a force in a direction away from the friction plates is input from the helical spline to each of the side gears during acceleration of the vehicle while a force in a direction approaching the friction plates is input from the helical spline to each of the side gears during deceleration of the vehicle.

In other words, from a perspective of straight-travel stability of the vehicle, it is requested to increase stability of the vehicle in a yaw direction. During the acceleration of the vehicle, a rear portion of the vehicle is lowered, and a load applied to the rear wheels is increased. Thus, the stability of the rear portion of the vehicle in the yaw direction is high. Meanwhile, during the deceleration of the vehicle, the rear portion of the vehicle is raised, and the load applied to the rear wheels is reduced. Thus, the stability of the rear portion of the vehicle in the yaw direction is reduced. For this reason, it is requested to improve the stability of the rear portion of the vehicle in the yaw direction by increasing the differential limiting force to be larger during the deceleration of the vehicle than during the acceleration of the vehicle. In the above configuration, since the force in the direction away from the friction plates is input to each of the side gears during the acceleration, the differential limiting force is reduced. Meanwhile, since the force in the direction approaching the friction plates is input to each of the side gears during the deceleration, the differential limiting force is increased. Therefore, the differential limiting force can be adjusted appropriately during the acceleration of the vehicle and during the deceleration of the vehicle.

An eighth aspect of the technique disclosed herein is directed to a vehicle. More specifically, the vehicle includes: a front drive unit that rotationally drives a front wheel; and a rear drive unit that can rotationally drive a rear wheel independently of the front drive unit and includes the vehicle differential according to the seventh aspect.

With this configuration, since the differential limiting force on the rear wheels can be adjusted appropriately during the acceleration of the vehicle and during the deceleration of the vehicle, it is possible to improve straight-travel stability of the vehicle.

ADVANTAGES

As it has been described so far, according to the technique disclosed herein, the differential capable of adjusting the differential limiting force with the simple configuration can be provided.

DETAILED DESCRIPTION

Hereinafter, exemplary embodiments are described in detail with reference to the drawings. In the following description, "up", "down", "front", "rear", "right", and "left" are respectively defined with "up", "down", "front", "rear", "right", and "left" directions seen from an occupant in a vehicle 1 being references.

First Embodiment

Overall Configuration of Vehicle

Figure 1:
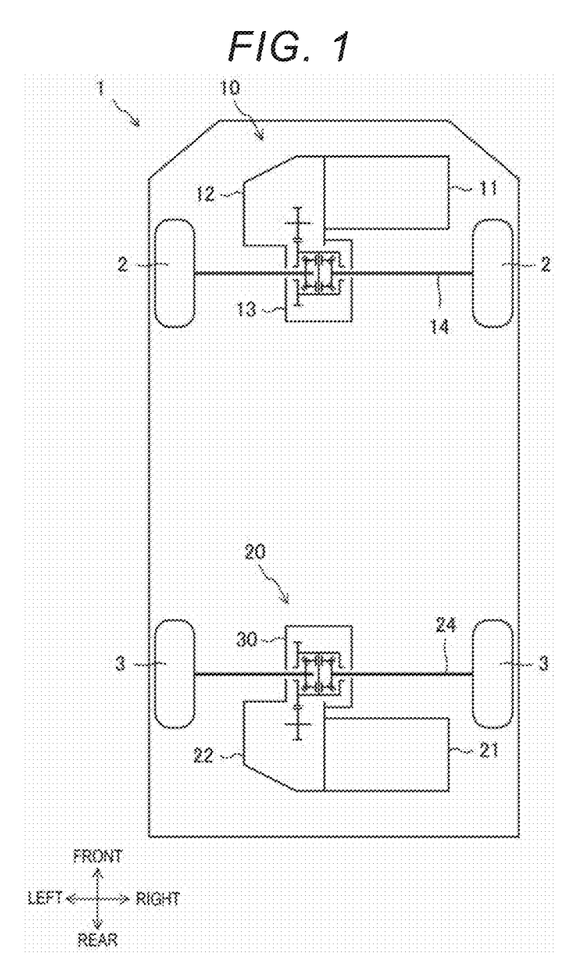
FIG. 1 is a schematic view of a vehicle having a differential according to a first embodiment.

FIG. 1 illustrates the vehicle 1 having a rear differential 30 according to this first embodiment. The vehicle 1 is a vehicle that is an electric car. The vehicle 1 is a vehicle as an all-wheel-drive vehicle in which both of front wheels 2 and rear wheels 3 are rotationally driven. The vehicle 1 enables independent rotation of each of the front wheels 2 and the rear wheels 3. A front drive unit 10 for causing the front wheels 2 to rotate is arranged in a front portion of the vehicle 1, and a rear drive unit 20 for causing the rear wheels 3 to rotate is arranged in a rear portion of the vehicle 1. The vehicle 1 does not include a shaft, such as a propeller shaft, that transmits drive power in a vehicle front-rear direction.

The front drive unit 10 includes a front drive motor 11, a front reduction drive 12, and a front differential 13. The front drive motor 11 is a drive source for causing the front wheels 2 to rotate. The rotation of the front drive motor 11 is decelerated by the front reduction drive 12, which is then transmitted to the front differential 13. The front differential 13 is coupled to the right and left front wheels 2 via a front driveshaft 14. The front differential 13 differentiates movement of the right and left front wheels 2 according to a travel state of the vehicle 1.

The rear drive unit 20 has a rear drive motor 21, a rear reduction drive 22, and the rear differential 30. Arrangement of the rear drive unit 20 is symmetrical to arrangement of the front drive unit 10 in the front-rear direction. The rear drive motor 21 is a drive source for causing the rear wheels 3 to rotate. The rotation of the rear drive motor 21 is decelerated by the rear reduction drive 22, which is then transmitted to the rear differential 30. The rear differential 30 is coupled to the right and left rear wheels 3 via a rear driveshaft 24. The rear differential 30 differentiates movement of the right and left rear wheels 3 according to the travel state of the vehicle 1.

In this embodiment, a configuration of the rear differential 30 is particularly devised. Thus, hereinafter, the configuration of the rear differential 30 is described in detail.

Rear Differential

Figure 2:
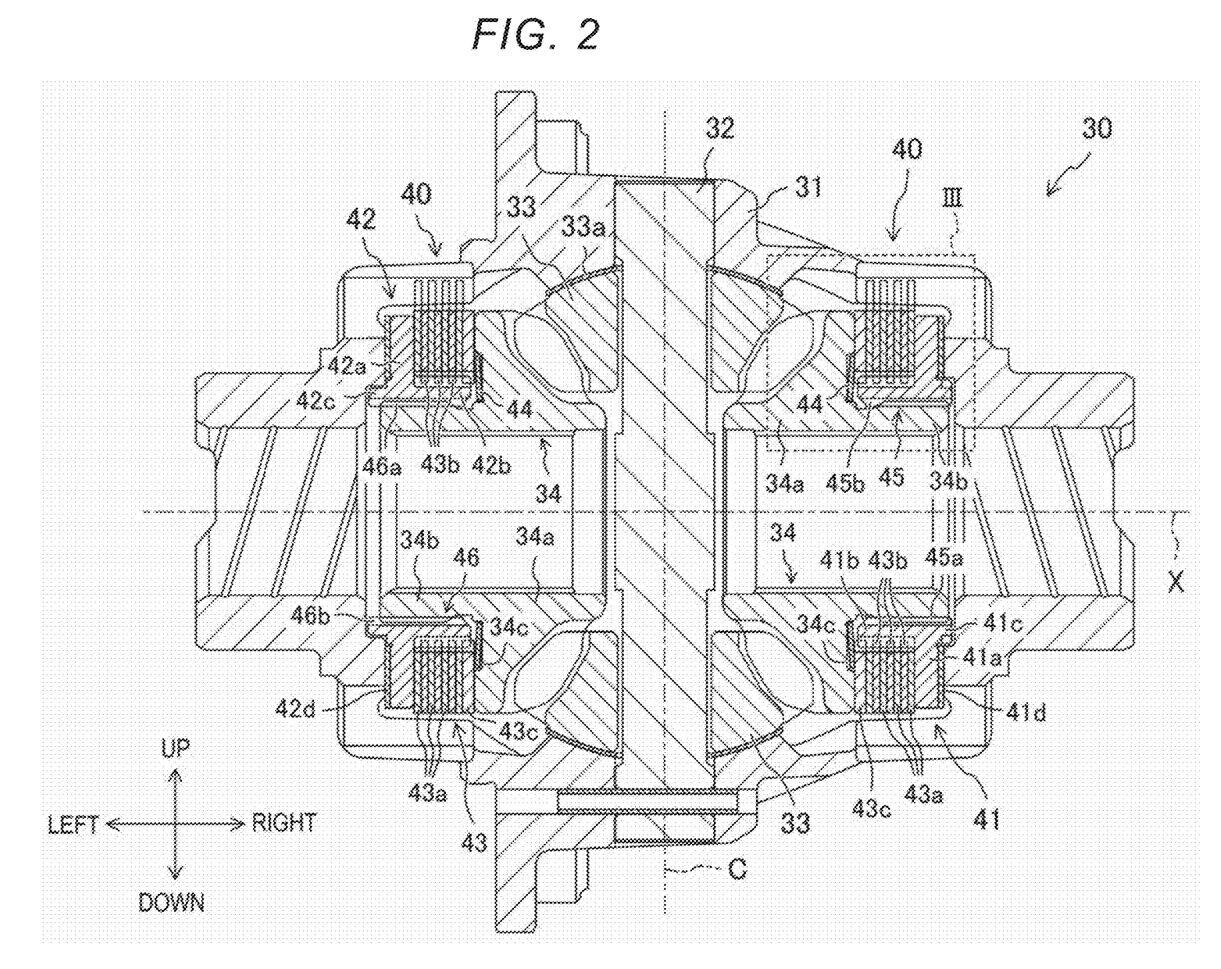
FIG. 2 is a cross-sectional view of the differential.

FIG. 2 schematically illustrates the rear differential 30. The rear differential 30 includes: a differential case 31; a pinion shaft 32 that is fixed to the differential case 31; a pair of pinion gears 33, each of which rotates about the pinion shaft 32; and a pair of side gears 34, each of which meshes with the pinion gears 33.

The differential case 31 rotates when receiving the drive power of the rear drive motor 21. The differential case 31 rotates about a rotation axis X when receiving the drive power from the rear reduction drive 22 via a final driven gear. The rotation axis X extends linearly in a vehicle width direction. In the following description, unless otherwise specified, an "axial direction" means an extending direction of the rotation axis X, and a "radial direction" means an orthogonal direction to the rotation axis X.

The pinion shaft 32 extends in the orthogonal direction to the rotation axis X. A center axis C of the pinion shaft 32 passes the rotation axis X and is orthogonal to the rotation axis X. When the differential case 31 rotates, the pinion shaft 32 rotates about the rotation axis X together with the differential case 31.

Each of the pinion gears 33 is arranged in the differential case 31. Each of the pinion gears 33 is attached to the pinion shaft 32 in a manner to be rotatable about the pinion shaft 32. One of the pinion gears 33 is arranged on a first end side of the pinion shaft 32, and the other of the pinion gears 33 is arranged on a second end side of the pinion shaft 32 across the rotation axis X. When the differential case 31 rotates, each of the pinion gears 33 rotates about the rotation axis X together with the pinion shaft 32. A rotation radius of the one pinion gear 33 about the rotation axis X is equal to a rotation radius of the other pinion gear 33 about the rotation axis X. Each of the pinion gears 33 meshes with both of the paired side gears 34. A washer 33a is arranged between each of the pinion gears 33 and the differential case 31 in the radial direction.

Each of the side gears 34 has a cylindrical shape. A cylindrical axis of each of the side gears 34 is coaxial with the rotation axis X. That is, in the differential case 31, each of the side gears 34 is arranged to be coaxial with the rotation axis X. One of the side gears 34 and the other of the side gears 34 are arranged to be mirror-symmetrical about a plane that passes the center axis C and is orthogonal to the rotation axis X.

Each of the side gears 34 has: a gear section 34a that meshes with the pinion gears 33; and a cylindrical section 34b that extends from a radially inner portion of the gear section 34a toward an opposite side from the pinion gears 33 in the axial direction (hereinafter referred to as an axially outer side). The rear driveshaft 24 is fastened to each of an inner circumferential surface of each of the gear sections 34a and an inner circumferential surface of each of the cylindrical sections 34b. A spline of a helical spline is formed on an outer circumferential surface of each of the cylindrical sections 34b. The cylindrical section 34b of the right side gear 34 has first inner spline teeth 45a of a first helical spline 45. The first inner spline teeth 45a are formed over the substantially entire cylindrical section 34b of the right side gear 34. The cylindrical section 34b of the left side gear 34 has second inner spline teeth 46a of a second helical spline 46. The second inner spline teeth 46a are formed over the substantially entire cylindrical section 34b of the left side gear 34.

Figure 3:
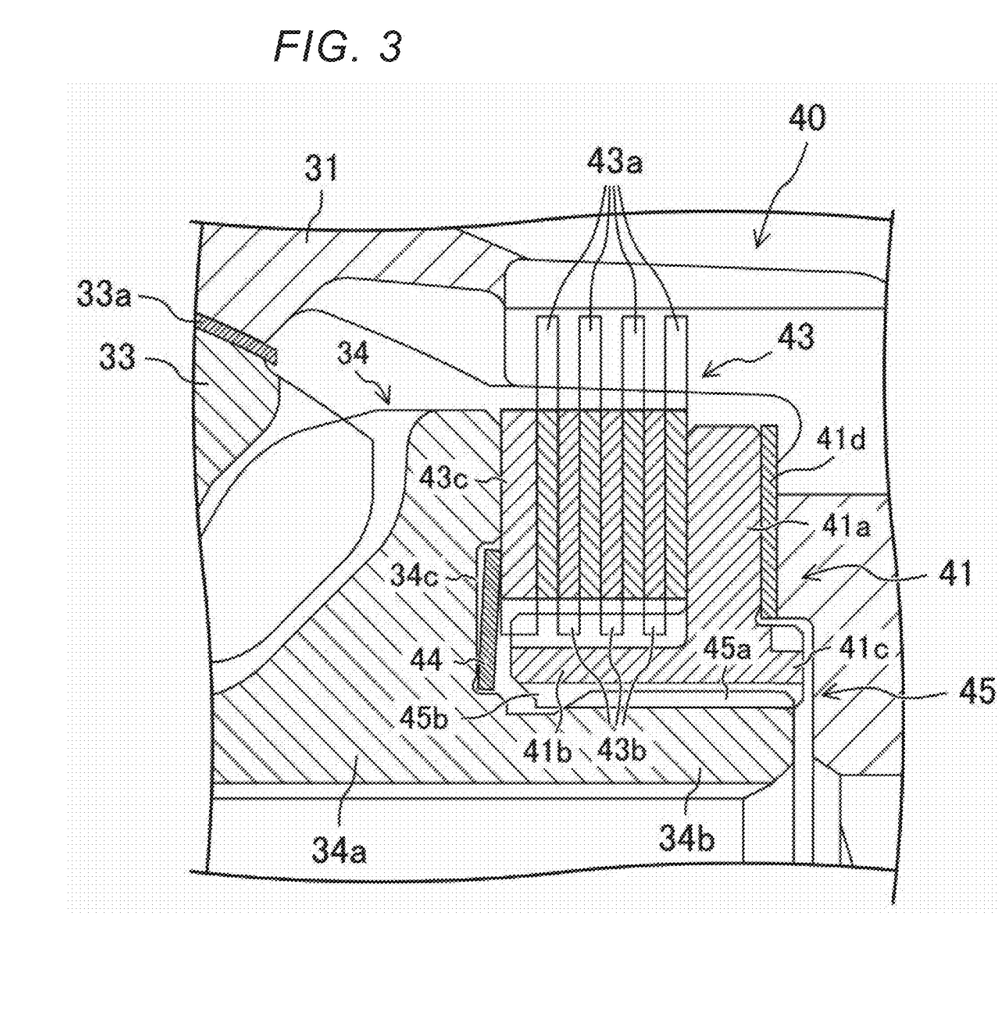
FIG. 3 is an enlarged view of an area III in FIG. 2.

As illustrated in FIGS. 2 and 3, the rear differential 30 includes a differential limiting mechanism 40 that applies a differential limiting force to limit the differential movement of the right and left rear wheels 3. Even in such a situation where one of the right and left rear wheels 3 idles, the differential limiting mechanism 40 transmits the force to the side gear 34, which is connected to the other rear wheel 3, and thereby causes the other wheel 3 to rotate. The differential limiting mechanism 40 is arranged on each side in the axial direction. The right differential limiting mechanism 40 includes: a plurality of friction plates 43; a first pressing member 41 that presses the friction plates 43 from the axially outer side; and a pair of disc springs 44, each of which presses the friction plates 43 from the pinion gears 33 side in the axial direction (hereinafter referred to as an axially inner side). The left differential limiting mechanism 40 includes: a plurality of friction plates 43; a second pressing member 42 that presses the friction plates 43 from the axially outer side; and a pair of disc springs 44, each of which presses the friction plates 43 from the axially inner side. Each of the differential limiting mechanisms 40 is arranged in the differential case 31.

The plurality of friction plates 43 has first friction plates 43a relatively located radially outward and second friction plates 43b relatively located radially inward. The first friction plates 43a and the second friction plates 43b are alternately aligned in the axial direction.

The first friction plates 43a are fixed to the differential case 31 in a manner not to make relative rotation about the rotation axis X. The first friction plates 43a rotates with the differential case 31 about the rotation axis X. The first friction plates 43a can move in the axial direction.

As illustrated in FIG. 3, of the second friction plates 43b, a thickness of a particular second friction plate 43c located at the innermost position in the axial direction is greater than thicknesses of the other second friction plates 43b. The thickness of each of the second friction plates 43b other than the particular second friction plate 43c is each equal to a thickness of each of the first friction plates 43a. The second friction plates 43b including the particular second friction plate 43c are spline-fitted to the first pressing member 41 and the second pressing member 42. The second friction plates 43b can move in the axial direction.

In the differential case 31, the first pressing member 41 is arranged on an opposite side to the right side gear 34, with interposing the right friction plates 43, in the axial direction, that is, on the right side of the right friction plates 43. The first pressing member 41 has a cylindrical shape, a cylindrical axis of which is coaxial with the rotation axis X. The first pressing member 41 is not fixed to the differential case 31 and can rotate relative to the differential case 31. The first pressing member 41 has: a disc-shaped first pressing section 41a that presses the friction plates 43; a first inner cylindrical section 41b that extends axially inward (leftward herein) from a radially inner portion of the first pressing section 41a; and a first outer cylindrical section 41c that extends axially outward (rightward herein) from the radially inner portion of the first pressing section 41a.

The first pressing section 41a is in contact with the first friction plate 43a located on the far-right side. The first pressing section 41a holds the right friction plates 43 with the left side gear 34. A first spacer 41d is arranged between a right surface of the first pressing section 41a and the differential case 31. The first spacer 41d abuts an inner surface of the differential case 31. Due to the first spacer 41d, the first pressing section 41a hardly moves axially outward. Thus, the first pressing member 41 hardly moves axially outward. The term "hardly moves axially outward" includes a case of no relative movement at all.

The first inner cylindrical section 41b extends linearly in the axial direction. A left end portion of the first inner cylindrical section 41b is located on the right side of the gear section 34a of the right side gear 34. The second friction plates 43b including the particular second friction plate 43c are each spline-fitted to a radially outward portion of the first inner cylindrical section 41b.

The first outer cylindrical section 41c extends linearly in the axial direction. The first outer cylindrical section 41c is formed in the differential case 31 and housed in a first recessed section that is recessed rightward.

The first pressing member 41 has first outer spline teeth 45b of the first helical spline 45 on an inner circumferential surface. The first outer spline teeth 45b are formed over the entire inner circumferential surface of the first pressing member 41 in the axial direction.

In the differential case 31, the second pressing member 42 is arranged on an opposite side to the left side gear 34, with interposing the left friction plates 43, in the axial direction, that is, on the left side of the left friction plates 43. The second pressing member 42 has a cylindrical shape, a cylindrical axis of which is coaxial with the rotation axis X. The second pressing member 42 is not fixed to the differential case 31 and can rotate relative to the differential case 31. The second pressing member 42 has: a disc-shaped second pressing section 42a that presses the friction plates 43; a second inner cylindrical section 42b that extends axially inward (rightward herein) from a radially inner portion of the second pressing section 42a; and a second outer cylindrical section 42c that extends axially outward (leftward herein) from the radially inner portion of the second pressing section 42a.

The second pressing section 42a is in contact with the second friction plate 43b located on the far-left side. The second pressing section 42a holds the left friction plates 43 with the left side gear 34. A second spacer 42d is arranged between a right surface of the second pressing section 42a and the differential case 31. The second spacer 42d abuts the inner surface of the differential case 31. Due to the second spacer 42d, the second pressing section 42a hardly moves axially outward. Thus, the second pressing member 42 hardly moves axially outward. The term "hardly moves axially outward" includes the case of no relative movement at all.

The second inner cylindrical section 42b extends linearly in the axial direction. A right end portion of the second inner cylindrical section 42b is located on the left side of the gear section 34a of the left side gear 34. The second friction plates 43b including the particular second friction plate 43c are each spline-fitted to a radially outward portion of the second inner cylindrical section 42b.

The second outer cylindrical section 42c extends linearly in the axial direction. The second outer cylindrical section 42c is formed in the differential case 31 and housed in a second recessed section that is recessed leftward. An axial length of the second outer cylindrical section 42c is longer than an axial length of the first outer cylindrical section 41c. A radial thickness of the second outer cylindrical section 42c is less than a radial thickness of the first outer cylindrical section 41c. An axial length of the second recessed section is longer than an axial length of the first recessed section. A radial length of the second recessed section is shorter than a radial length of the first recessed section.

The second pressing member 42 has second outer spline teeth 46b of the second helical spline 46 on an inner circumferential surface. The second outer spline teeth 46b are formed over the entire inner circumferential surface of the second pressing member 42 in the axial direction.

As illustrated in FIG. 2 and FIG. 3, each of the disc springs 44 is housed in a spring housing section 34c formed in the respective gear section 34a of the respective side gear 34. Each of the spring housing sections 34c is provided in an axially outer portion of the respective gear section 34a and recessed axially inward. Each of the disc springs 44 presses the respective particular second friction plate 43c axially outward.

Operation of Differential Limiting Mechanism

The differential limiting mechanisms 40 adjust the differential limiting force by adjusting respective ones of the spline teeth 45a, 45b, 46a, 46b of the first helical spline 45 and the second helical spline 46. In this first embodiment, each of the spline teeth 45a, 45b, 46a, 46b is adjusted in a manner to increase the differential limiting force during deceleration of the vehicle 1 while reducing the differential limiting force during acceleration of the vehicle 1. Hereinafter, operation of the differential limiting mechanisms 40 is described with reference to FIG. 4 and FIG. 5. Since the right differential limiting mechanism 40 and the left differential limiting mechanism 40 are bilaterally symmetrical only in terms of a force transmission direction, the operation of the right differential limiting mechanism 40 is described in detail below, and the operation of the left differential limiting mechanism 40 is not described in detail. It is assumed that the differential case 31 rotates clockwise when seen from the right side during forward travel of the vehicle 1. In addition, in the following description, it is assumed that the vehicle 1 travels straight and the pinion gears 33 do not rotate about the pinion shaft 32.

Figure 4:
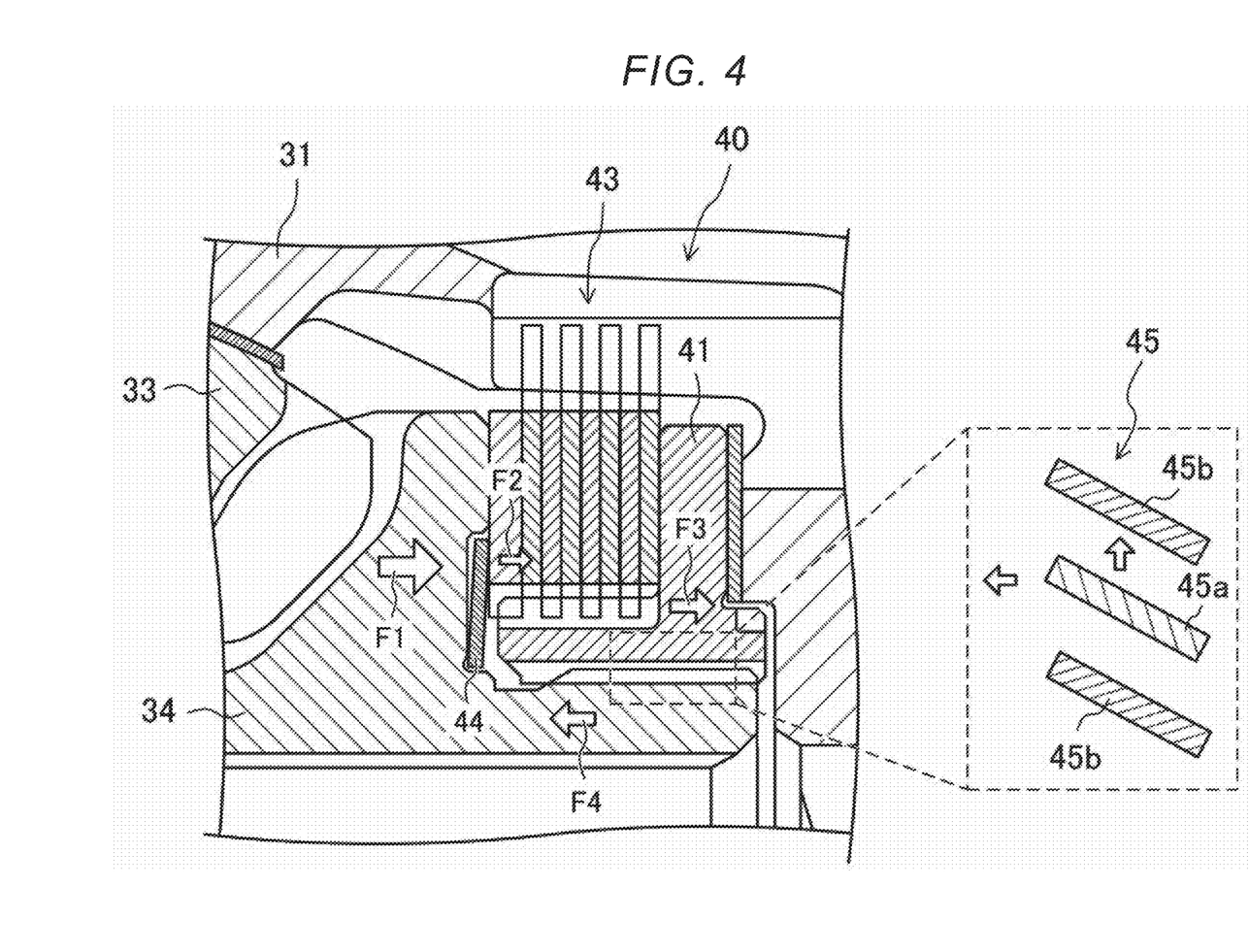
FIG. 4 is a schematic view illustrating a force input to a friction plate during acceleration.

FIG. 4 schematically illustrates the force input to the friction plates 43 during the acceleration of the vehicle 1. First, when the vehicle 1 travels forward, the pinion gear 33 rotates with the differential case 31 about the rotation axis X, and a meshing reaction force F1 is thereby generated by meshing of the side gear 34 with the pinion gear 33. The meshing reaction force F1 is a force that is directed axially outward. In addition, initial torque F2 is generated from the disc spring 44. The initial torque F2 is a force that presses the particular second friction plate 43c axially outward, but also acts on the side gear 34.

During the acceleration of the vehicle 1, the side gear 34 is subjected to rotational torque in the same direction as a rotational direction during the forward travel. At this time, the first pressing member 41 is subjected to a meshing thrust force F3, which is directed axially outward, via the first helical spline 45. The first pressing member 41 does not move axially outward relative to the differential case 31. Thus, even when the meshing thrust force F3 is generated, the first pressing member 41 hardly moves away from the friction plates 43. Meanwhile, the side gear 34 is subjected to a meshing thrust reaction force F4 directed axially inward due to counteraction from the first helical spline 45. A magnitude of the meshing thrust reaction force F4 is the same as a magnitude of the meshing thrust force F3.

The friction plates 43 are subjected to the meshing reaction force F1 and the meshing thrust reaction force F4 from the side gear 34. Thus, when the axially outer side is a positive side, and the axially inner side is a negative side, a force FA of the side gear 34 to press the friction plates 43 during the acceleration is as follows.

$$FA = F1 - F4$$

Figure 5:
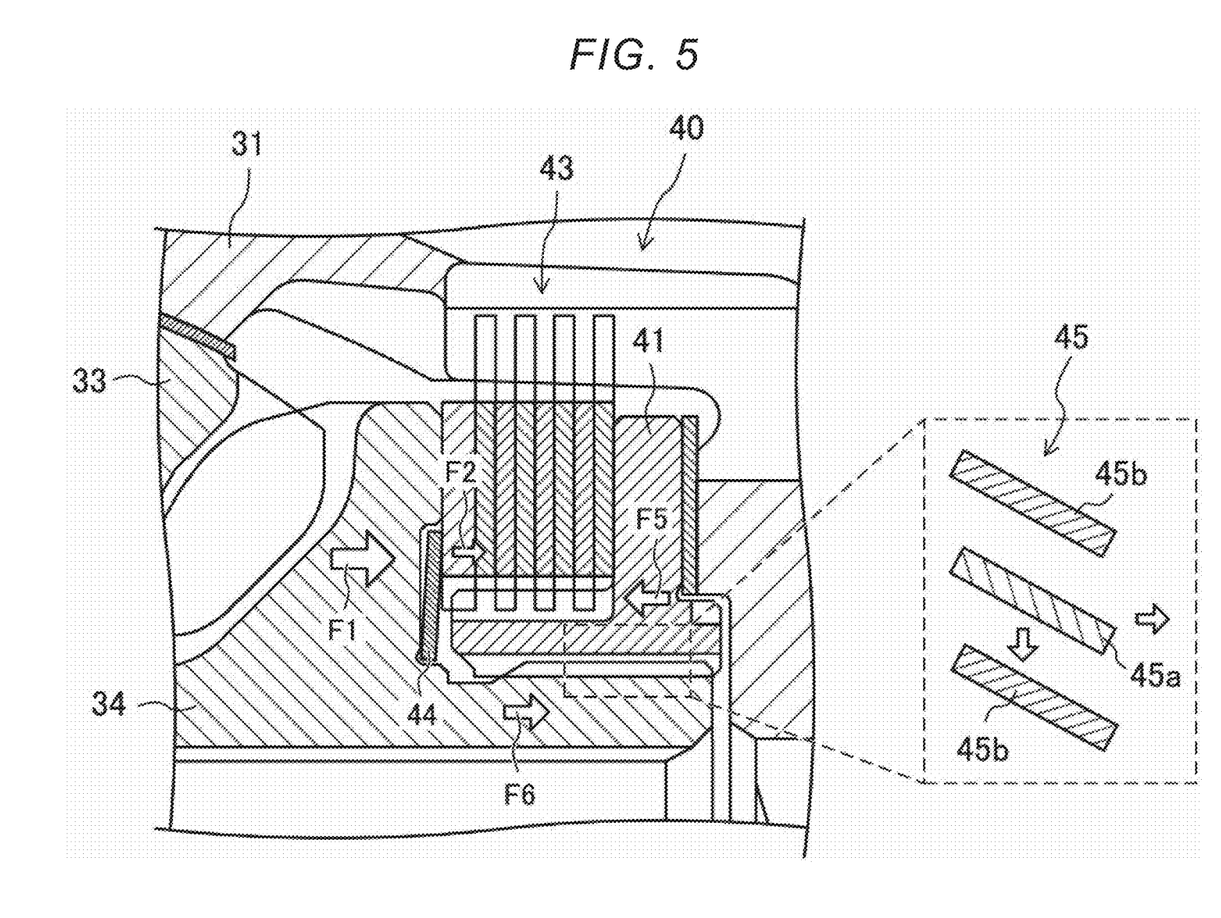
FIG. 5 is a schematic view illustrating a force input to the friction plate during deceleration.

FIG. 5 schematically illustrates the force input to the friction plates 43 during the deceleration of the vehicle 1. Since the vehicle 1 travels forward, the meshing reaction force F1 is generated, similar to the time of the acceleration.

During the deceleration of the vehicle 1, the side gear 34 is subjected to rotational torque in an opposite direction from the rotational direction during the forward travel. At this time, the first pressing member 41 is subjected to a meshing thrust force F5, which is directed axially inward, via the first helical spline 45. Meanwhile, the side gear 34 is subjected to a meshing thrust reaction force F6 directed axially outward due to the counteraction from the first helical spline 45. A magnitude of the meshing thrust reaction force F6 is the same as the magnitude of the meshing thrust reaction force F6.

The friction plates 43 are subjected to the meshing reaction force F1 and the meshing thrust reaction force F6 from the side gear 34. Thus, when the axially outer side is the positive side, and the axially inner side is the negative side, a force FC of the side gear 34 to press the friction plates 43 during the deceleration is as follows.

$$FC = F1 + F6$$

As described above, during the acceleration of the vehicle 1, the force of the side gear 34 to press the friction plates 43 is smaller than that during the deceleration of the vehicle 1.

Since the first pressing member 41 and the second pressing member 42 hardly move axially outward, the force of the side gear 34 to press the friction plates 43 is input as is to the friction plates 43. When the force input to the friction plates 43 becomes small, a dynamic friction force between each of the first friction plates 43a and respective one of the second friction plates 43b becomes small. Thus, the differential limiting force becomes small. On the contrary, when the force input to the friction plates 43 becomes large, the dynamic friction force between each of the first friction plates 43a and respective one of the second friction plates 43b becomes large. Thus, the differential limiting force becomes large. Therefore, the differential limiting mechanism 40 increases the differential limiting force during the deceleration of the vehicle 1 while reducing the differential limiting force during the acceleration of the vehicle 1.

In the left differential limiting mechanism 40, the spline teeth 46a, 46b of the second helical spline 46 are arranged bilaterally symmetrical to the spline teeth 45a, 45b of the first helical spline 45, and thus the force transmission direction thereof is bilaterally symmetrical. Sizes and angles of the spline teeth 46a, 46b of the second helical spline 46 are the same as those of the spline teeth 45a, 45b of the first helical spline 45. Meshing thrust forces and meshing thrust reaction forces generated by the second helical spline 46 are the same as the meshing thrust forces F3, F5 and the meshing thrust reaction forces F4, F6 generated by the first helical spline 45. The term "same" described herein includes not only a case of strict agreement but also a case where there is a difference to the extent that they can be regarded as substantially the same.

Effects of First Embodiment

In this first embodiment, the rear differential 30 includes the differential limiting mechanisms 40 each having: the plurality of the friction plates 43, each of which is arranged on the axially outer side of each of the side gears 34; and respective one of the first pressing member 41 and the second pressing member 42, which has the cylindrical shape coaxial with the rotation axis X, is arranged on the opposite side to the side gear 34, with interposing the plurality of the friction plates 43, in the axial direction, and holds the plurality of the friction plates 43 with the side gear 34. The pair of the side gears 34 each have: the gear section 34a that meshes with the pinion gears 33; and the cylindrical section 34b that extends axially outward from the radially inner portion of the gear section 34a, and the cylindrical axis of which is coaxial with the rotation axis X. The outer circumferential portion of the cylindrical section 34b of one of the side gears 34 meshes with the inner circumferential portion of the first pressing member 41 via the first helical spline 45, and the outer circumferential portion of the cylindrical section 34b of the other side gear 34 meshes with the e inner circumferential portion of the second pressing member 42 via the second helical spline 46. When the first pressing member 41 and the second pressing member 42 are subjected to the force directed axially outward via the first helical spline 45 and the second helical spline 46, respectively, the force directed axially inward is input to the side gears 34 due to the counteraction from the first helical spline 45 and the second helical spline 46. This reduces a force to hold the plurality of the friction plates 43 and further reduces the friction force applied between the plurality of the friction plates 43. As a result, the differential limiting force is reduced. Meanwhile, when the first pressing member 41 and the second pressing member 42 are subjected to the force directed axially inward via the first helical spline 45 and the second helical spline 46, respectively, the force directed axially outward is input to the side gears 34 due to the counteraction from the first helical spline 45 and the second helical spline 46. This increases the force to hold the plurality of the friction plates 43 and further increases the friction force applied between the plurality of the friction plates 43. As a result, the differential limiting force is increased. The direction of the force applied to each of the first helical spline 45 and the second helical spline 46 is opposite during the acceleration and the deceleration of the vehicle 1. Thus, the differential limiting force can be changed during the acceleration and the deceleration of the vehicle 1 In addition, the magnitude of the differential limiting force can be adjusted by adjusting the angles of the spline teeth 45a, 45b of the first helical spline 45 and the spline teeth 46a, 46b of the second helical spline 46. Thus, the magnitude of the differential limiting force can be adjusted easily. Therefore, the differential limiting force can be adjusted with the simple configuration.

In particular, in this first embodiment, in the rear differential 30, the first helical spline 45 and the second helical spline 46 are respectively formed with the spline teeth 45a, 45b, 46a, 46b such that the meshing thrust reaction force directed axially inward is input to each of the side gears 34 during the acceleration of the vehicle 1 while the meshing thrust reaction force directed axially outward is input to each of the side gears 34 during the deceleration of the vehicle 1.

That is, in this first embodiment, a shaft that transmits the drive power in the vehicle front-rear direction, such as a propeller shaft, is not provided in the vehicle 1. Conventionally, straight-travel stability of the vehicle is improved by increasing the differential limiting force with such a shaft and thereby increasing stability of a rear portion of the vehicle in a yaw direction. When such a shaft is not provided as in the vehicle 1, another mechanism is required to increase the stability in the yaw direction and thereby improve the straight-travel stability. During the acceleration of the vehicle 1, the rear portion of the vehicle 1 is lowered, and a load applied to each of the rear wheels 3 is increased. Thus, the stability of the rear portion of the vehicle 1 in the yaw direction is high. Meanwhile, during the deceleration of the vehicle 1, the rear portion of the vehicle 1 is raised, and the load applied to each of the rear wheels 3 is reduced. Thus, the stability of the rear portion of the vehicle 1 in the yaw direction is reduced. For this reason, it is requested to improve the stability of the rear portion of the vehicle 1 in the yaw direction by increasing the differential limiting force to be larger during the deceleration of the vehicle 1 than during the acceleration of the vehicle 1. In this first embodiment, during the acceleration, the meshing thrust reaction force directed axially inward is input to each of the side gears 34, and thus the differential limiting force is reduced. Meanwhile, during the deceleration, the meshing thrust reaction force directed axially outward is input to each of the side gears 34, and thus the differential limiting force is increased. Accordingly, the differential limiting force is larger during the deceleration of the vehicle 1 than during the acceleration of the vehicle 1. Therefore, the straight-travel stability of the vehicle 1 can be improved.

In this first embodiment, the second friction plates 43b of the plurality of the friction plates 43 are spline-fitted to either one of the first pressing member 41 and the second pressing member 42, and the first friction plates 43a of the plurality of the friction plates 43 are fixed to the differential case 31. Thus, in the cylindrical section 34b of each of the side gears 34, an area available for respective one of the first inner spline teeth 45a and the second inner spline teeth 46a can be enlarged as much as possible. As a result, even when the cylindrical section 34b is reduced in length in the rotation axis direction, the sufficiently large meshing thrust reaction force can be input to each of the side gears 34 via respective one of the first helical spline 45 and the second helical spline 46. Therefore, the rear differential 30 can have a compact configuration.

In this first embodiment, the pair of the disc springs 44 is further provided to respectively input the force directed axially outward to the plurality of the friction plates 43, and each of the gear sections 34a has the spring housing section 34c that is provided in the axially outer portion, recessed axially inward, and respectively houses the disc spring 44. The disc spring 44 can apply the initial torque to the friction plates 43. By arranging the disc spring 44 in the spring housing section 34c, it is possible to suppress enlargement of the rear differential 30 in the rotation axis direction, which is caused by the disc springs 44. In other words, the rear differential 30 can have a compact configuration while a mechanism to apply the initial torque is employed. In addition, by housing the disc spring 44 in the spring housing section 34c, the initial torque can be input to the friction plates 43 in an independent manner of the meshing reaction force F1 between the pinion gear 33 and the side gear 34 and the meshing thrust reaction force via respective one of the first helical spline 45 and the second helical spline 46. As a result, a magnitude of the initial torque can be set appropriately.

Second Embodiment

Hereinafter, a second embodiment is described in detail with reference to the drawings. In the following description, components in common with the components in the first embodiment are denoted by the same reference signs, and the detailed description thereon is not made.

Differential Limiting Mechanism

Figure 6:
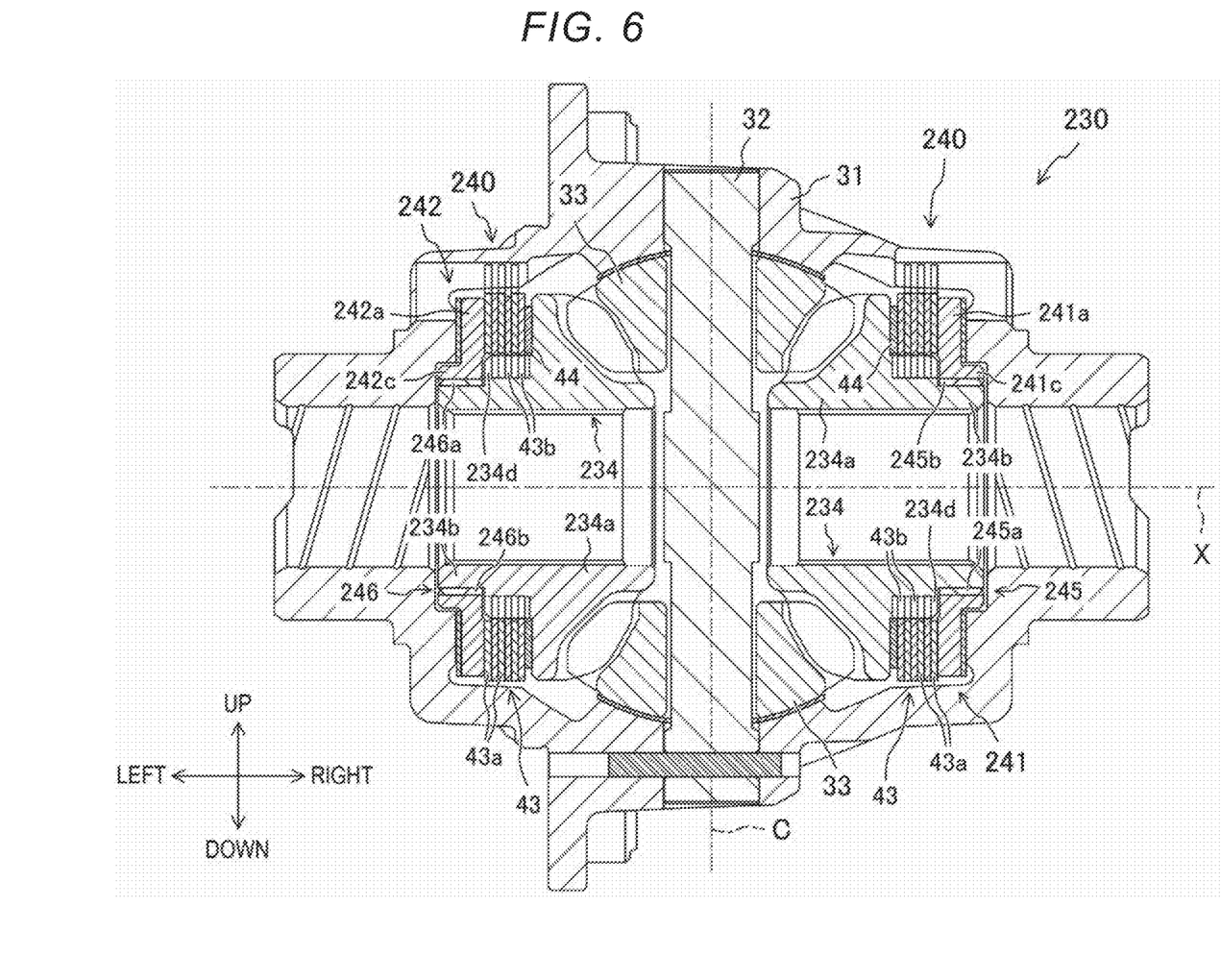
FIG. 6 is a cross-sectional view of a differential according to a second embodiment.

In this second embodiment, a configuration of a differential limiting mechanism 240 in a rear differential 230 differs from that in the first embodiment.

As illustrated in FIG. 6, in this second embodiment, side gears 234 each have spline teeth 234d for spline-fitting to the second friction plates 43b. The second friction plates 43b are fitted to the spline teeth 234d. The second friction plates 43b have the same thickness. Similar to the first embodiment, the first friction plates 43a are fixed to the differential case 31 in the manner not to make the relative rotation about the rotation axis X. The first friction plates 43a rotate with the differential case 31 about the rotation axis X. The first friction plates 43a have the same thickness.

First inner spline teeth 245a of a first helical spline 245 are provided in an axially outer portion of a right cylindrical section 234b from the spline teeth 234d. Second inner spline teeth 246a of a second helical spline 246 are provided in an axially outer portion of a left cylindrical section 234b from the spline teeth 234d.

A first pressing member 241 is not provided with a first inner cylindrical section and has a first pressing section 241a and a first outer cylindrical section 241c. First outer spline teeth 245b of the first helical spline 245 are formed over an entire inner circumferential surface of the first pressing member 241 in the axial direction.

A second pressing member 242 is not provided with a second inner cylindrical section and has a second pressing section 242a and a second outer cylindrical section 242c. Second outer spline teeth 246b of the second helical spline 246 are formed over an entire inner circumferential surface of the second pressing member 242 in the axial direction.

The disc spring 44 is located on the radially outer side of the spline teeth 234d in a gear section 234a of each of the side gears 234.

Similar to the first embodiment, the first helical spline 245 and the second helical spline 246 are respectively formed with the spline teeth 245a, 245b, 246a, 246b such that the force directed axially inward is input to each of the side gears 234 from respective one of the first helical spline 245 and the second helical spline 246 during the acceleration of the vehicle 1 while the force directed axially outward is input to each of the side gears 234 from respective one of the first helical spline 245 and the second helical spline 246 during the deceleration of the vehicle 1. In addition, in this second embodiment, the first helical spline 245 and the second helical spline 246 each have a multiple-start thread structure with two starts or more.

Effects of Second Embodiment

Also, in this second embodiment, similar to the first embodiment, it is possible to change the force applied to the friction plates 43 during the acceleration and the deceleration of the vehicle by the first helical spline 245 and the second helical spline 246. Therefore, the differential limiting force can be adjusted with the simple configuration.

With this configuration, the second friction plates 43b are integrated with the side gears 234. Thus, the relatively large meshing thrust reaction force can be input. This can increase a range of the adjustable differential limiting force as wide as possible.

Other Embodiments

The technique disclosed herein is not limited to that in the above-described embodiment and can be substituted with another technique within the scope that does not depart from the gist of the claims.

In the first and second embodiments described above, the differential limiting mechanisms 40, 240 are provided on each side in the rotation axis direction. However, the differential limiting mechanisms 40, 240 are not limited thereto and may be provided on one side in the rotation axis direction, that is, only one of the right and left sides.

In the first and second embodiments described above, the differential limiting mechanisms 40, 240 are mounted on the rear differentials 30, 230, respectively. However, the technique disclosed herein is not limited thereto. A differential limiting mechanism may be mounted on the front differential 13. In this case, contrary to the rear differentials 30, 230, each of the spline teeth of a first helical spline and a second helical spline are formed such that the force directed axially outward is input to each of the side gears 34, 234 from respective one of the first helical spline and the second helical spline during the acceleration of the vehicle while the force directed axially inward is input to each of the side gears 34, 234 from respective one of the first helical spline and the second helical spline during the deceleration of the vehicle.

In the above-described first embodiment, each of the side gears 34 has the spring housing section 34c for housing the disc spring 44. However, the technique disclosed herein is not limited thereto. Each of the side gears 34 may not have the spring housing section 34c, and the disc spring 44 may be arranged between the axially outer portion of the gear section 34a in each of the side gears 34 and the friction plates 43.

In the above-described first embodiment, the second friction plates 43b are spline-fitted to the first inner cylindrical section 41b of the first pressing member 41 and the second inner cylindrical section 42b of the second pressing member 42. However, the technique disclosed herein is not limited thereto. Comb teeth may be formed on the first inner cylindrical section 41b and the second inner cylindrical section 42b to hold the second friction plates 43b on the comb teeth.

The above-described embodiments are merely illustrative, and thus the scope of the present disclosure should not be interpreted in a restrictive manner. The scope of the present disclosure is defined by the claims, and all modifications and changes falling within equivalents of the claims fall within the scope of the present disclosure.

INDUSTRIAL APPLICABILITY

The technique disclosed herein is useful for a vehicle differential and a vehicle having the vehicle differential.

REFERENCE SIGNS LIST

1: vehicle
2: front wheel
3: rear wheel
10: front drive unit
20: rear drive unit
21: rear drive motor (drive source)
30: rear differential
31: differential case
33: pinion gear
34: side gear
34a: gear section
34b: cylindrical section
34c: spring housing section
40: differential limiting mechanism
41: first pressing member
42: second pressing member
43: friction plate
44: disc spring
45: first helical spline
45a: first inner spline tooth
45b: first outer spline tooth
46: second helical spline
46a: second inner spline tooth
46b: second outer spline tooth
230: rear differential
234: side gear
234a: gear section
234b: cylindrical section
240: differential limiting mechanism
245: first helical spline
245a: first inner spline tooth
245b: first outer spline tooth
246: second helical spline
246a: second inner spline tooth
246b: second outer spline tooth
X: rotation axis

The invention claimed is:

1. A vehicle differential mounted on a vehicle, the vehicle differential comprising:
  a differential case that receives drive power of a drive source and rotates;

a pair of side gears arranged in the differential case in a coaxial manner with a rotation axis of the differential case;
a pinion gear that meshes with both side gears of the pair of side gears; and
a differential limiting mechanism provided to at least one side in a rotation axis direction,
wherein:
the differential limiting mechanism has:
a plurality of friction plates arranged on an opposite side to the pinion gear, with respect to at least one of the side gears, in the rotation axis direction; and
a pressing member arranged on an opposite side to the at least one of the side gears and interposing the plurality of friction plates therebetween, in the rotation axis direction and holding the plurality of friction plates together with the at least one of the side gears,
each of the side gears located on the one side in the rotation axis direction has:
a gear section that meshes with the pinion gear; and
a cylindrical section that extends from a radially inner portion of the gear section with respect to the rotation axis toward an opposite side to the pinion gear and a cylindrical axis of which is coaxial with the rotation axis, and
an outer circumferential portion of the cylindrical section meshes with an inner circumferential portion of the pressing member via a helical spline.

2. The vehicle differential according to claim 1, wherein:
some of the plurality of friction plates are spline-fitted to the pressing member, and
the rest of the plurality of friction plates are fixed to the differential case.

3. The vehicle differential according to claim 2, wherein the differential limiting mechanism further has a disc spring that inputs a force directed toward the pressing member side in the rotation axis direction to the plurality of friction plates, and
the gear section has a spring housing section that is provided in a portion on the friction plate side in the rotation axis direction and is recessed to an opposite side to the friction plates in the rotation axis direction to house the disc spring.

4. The vehicle differential according to claim 3, wherein the differential limiting mechanism is arranged on each side in the rotation axis direction.

5. The vehicle differential according to claim 4, wherein:
the vehicle is a rear-wheel-drive vehicle or an all-wheel-drive vehicle, and
the vehicle differential is a differential control of a rear wheel of the vehicle.

6. The vehicle differential according to claim 5, wherein the helical spline is formed with a spline tooth such that a force in a direction away from the friction plates is input from the helical spline to each of the side gears during acceleration of the vehicle while a force in a direction approaching the friction plates is input from the helical spline to each of the side gears during deceleration of the vehicle.

7. A vehicle, comprising:
a front drive unit that rotationally drives a front wheel; and
a rear drive unit that rotationally drives a rear wheel independently of the front drive unit and includes the vehicle differential according to claim 6.

8. The vehicle differential according to claim 2, wherein the differential limiting mechanism is arranged on each side in the rotation axis direction.

9. The vehicle differential according to claim 2, wherein:
the vehicle is a rear-wheel-drive vehicle or an all-wheel-drive vehicle, and
the vehicle differential is a differential control of a rear wheel of the vehicle.

10. The vehicle differential according to claim 1, wherein:
some of the plurality of friction plates are spline-fitted to the cylindrical section, and
the rest of the plurality of friction plates are fixed to the differential case.

11. The vehicle differential according to claim 10, wherein:
the differential limiting mechanism further has a disc spring that inputs a force directed toward the pressing member side in the rotation axis direction to the plurality of friction plates, and
the gear section has a spring housing section that is provided in a portion on the friction plate side in the rotation axis direction and is recessed to an opposite side to the friction plates in the rotation axis direction to house the disc spring.

12. The vehicle differential according to claim 10, wherein the differential limiting mechanism is arranged on each side in the rotation axis direction.

13. The vehicle differential according to claim 10, wherein:
the vehicle is a rear-wheel-drive vehicle or an all-wheel-drive vehicle, and
the vehicle differential is a differential control of a rear wheel of the vehicle.

14. The vehicle differential according to claim 1, wherein:
the differential limiting mechanism further has a disc spring that inputs a force directed toward the pressing member side in the rotation axis direction to the plurality of friction plates, and
the gear section has a spring housing section that is provided in a portion on the friction plate side in the rotation axis direction and is recessed to an opposite side to the friction plates in the rotation axis direction to house the disc spring.

15. The vehicle differential according to claim 14, wherein the differential limiting mechanism is arranged on each side in the rotation axis direction.

16. The vehicle differential according to claim 14, wherein:
the vehicle is a rear-wheel-drive vehicle or an all-wheel-drive vehicle, and
the vehicle differential is a differential control of a rear wheel of the vehicle.

17. The vehicle differential according to claim 1, wherein the differential limiting mechanism is arranged on each side in the rotation axis direction.

18. The vehicle differential according to claim 17, wherein:
the vehicle is a rear-wheel-drive vehicle or an all-wheel-drive vehicle, and
the vehicle differential is a differential control of a rear wheel of the vehicle.

19. The vehicle differential according to claim 1, wherein:
the vehicle is a rear-wheel-drive vehicle or an all-wheel-drive vehicle, and
the vehicle differential is a differential control of a rear wheel of the vehicle.

20. The vehicle differential according to claim 19, wherein the helical spline is formed with a spline tooth such that a force in a direction away from the friction plates is input from the helical spline to the at least one of the side gears during acceleration of the vehicle while a force in a direction approaching the friction plates is input from the helical spline to the at least one of the side gears during deceleration of the vehicle.

* * * * *